United States Patent [19]
Ling

[11] 3,867,517
[45] Feb. 18, 1975

[54] DIRECT RADIOIMMUNOASSAY FOR ANTIGENS AND THEIR ANTIBODIES

[75] Inventor: Chung-Mei Ling, Crystal Lake, Ill.

[73] Assignee: Abbott Laboratories, North Chicago, Ill.

[22] Filed: Dec. 21, 1971

[21] Appl. No.: 210,510

[52] U.S. Cl. .................. 424/1, 23/230 B, 23/252 R
[51] Int. Cl. ............................................ A61k 27/04
[58] Field of Search ...................... 424/1; 23/230 B; 250/106 T

[56] References Cited
UNITED STATES PATENTS
3,592,888   7/1971   Wolf ...................................... 424/1
3,646,346   2/1972   Catt ................................. 424/1 UX

OTHER PUBLICATIONS

Salmon et al., The Journal of Immunology, Vol. 103, No. 1, July 1969, pp. 129–137.
Salmon and Smith, The Journal of Immunology, Vol. 104, No. 3, March, 1970 pp. 665–672
Walsh et al., The Journal of Infectious Diseases, Vol. 121, No. 5, May 1970, pp. 550–554.
Wide, Karolinska Symposia, 1st Symposia, Sept. 23–25, 1969, University Hospital, Uppsala, Sweden, pp. 207–214.

*Primary Examiner*—Leland A. Sebastian
*Attorney, Agent, or Firm*—Leonard W. Sherman; Edwin A. Shalloway; Mark A. Greenfield

[57] ABSTRACT

A method for direct radioimmunoassay of antigens or their associated antibodies utilizing a coated test well comprising adding a serum to be tested for an antigen to test apparatus coated with its antibody; incubating the tubes for from 0.5 to 42 hours; aspirating the contents and washing the same with a Tris-HCl and sodium azide mixture; adding purified I-125 labeled antibody into the tube and incubating for from 1 to 24 hours; aspirating and washing the contents; and counting the tube for I-125 radiation. A similar assay for the antibody may be conducted utilizing an antigen coated tube and I-125 labeled antigen. The method for coating these tubes comprises adding the antigen or antibody solution in a Tris-HCl, sodium azide solution into a suitable test tube or well, incubating the tubes at room temperature from 6 to 72 hours, aspirating and washing the contents and storing at from between 2 and 25°C. until use.

4 Claims, 1 Drawing Figure

PATENTED FEB 18 1975 3,867,517
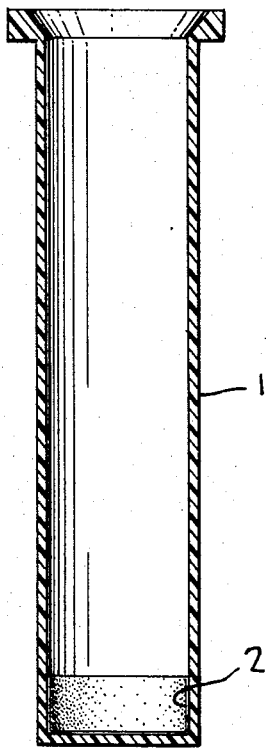

DIRECT RADIOIMMUNOASSAY FOR ANTIGENS AND THEIR ANTIBODIES

This invention relates to a diagnostic method for the radioimmunoassay of antigens and their antibodies and a method for coating apparatus useful in the above determination. More particularly, this invention relates to a direct method for determining hepatitis associated antigens or their antibodies and is also directed toward a method for preparing diagnostic apparatus suitable for use in the same.

Although there have been methods for determining the presence of antigenically active macromolecules such as intact viruses, virus capsids, virus subunits, bacteria, membranes, cell walls, hormones, etc., there has been a lack of a simple, yet sensitive, test method and apparatus for determining the presence of these materials. Viral hepatitis, including so-called serum hepatitis, which is a relatively common disease, has not been heretofore easily detected by a sensitive test which is both specific and reproducible for quickly determining whether or not the sera from a patient or a donor contains hepatitis associated antigens or antibodies.

Furthermore, radioimmunoassay techniques have been developed in the past for various antigen-antibody materials; however, these radioimmunoassay techniques such as disclosed in articles by Kevin Catt et al. in the *Journal of Biochemistry*, 1966, Volume 100, pages 31c and 33c and in *Science*, Volumen 158, page 1570, 1967, are an indirect radioimmunoassay technique wherein the amount of antigen present is roughly inversely proportional to the amount of radiation emitted by the tracer material. These procedures required the use of correlation tables and other materials which generally rendered the results less than reproducible and exact.

Briefly, it has been discovered that the above-noted difficulties, i.e. lack of reproducibility and exactness, have been overcome by utilizing the method of the present invention. Briefly, the method of the present invention comprises contacting an unknown serum sample with an antibody coated implement, incubating the test implement and serum for a period of from 0.5 to 42 hours, aspirating and washing, contacting a I-125 labeled antibody with the serum and coating the test apparatus and incubating for from 1 to 6 hours, aspirating and washing, and counting the tube for I-125 gamma radiation.

It is therefore the principal object of the present invention to provide a novel method for the direct determination of antigens and their antibodies.

It is a further object of the present invention is to provide a method for coating diagnostic apparatus for use in radioimmunoassay determinations.

It is a still further object of the present invention to provide a method for quickly and accurately determining the presence of hepatitis associated antigens or antibodies in sera.

Still further objects and advantages of the diagnostic method for direct radioimmunoassay and method for coating test implements useful in the same will become more apparent from the following more detailed description thereof and the following attached drawing wherein:

The drawing is a cut-away view of a coated test implement useful in the method of the present invention.

The drawing shows a test tube shaped test implement 1 with a coated portion 2. Coated portion 2 has a coating of an antigen or its antibody preferably located as shown, i.e. in the bottom of the tube. Although the drawing shows one embodiment of apparatus suitable for use in performing the method of the present invention, the method of this invention should not be limited thereto.

Coated portion 2 is coated with either an antigen or an antibody depending on the material to be tested. Since the method is similar with regard to almost all antigens and antibodies, the process for coating these tubes will be described with reference to a particular hepatitis associated antibody, i.e. anti-Australia antigen. A solution of anti-Australia antigen having a concentration of from about 1 to about 100 micrograms of protein per ml. is prepared from an anti-Australia antigen serum in from about 0.005 to about 0.02 molar Tris-HCl, i.e. 2-amino-2-hydroxymethyl-1,3-propanediol-HCl. The Tris-HCl buffers the solution to a pH of from about 7.1 to about 9.5 together with from about 0.01% to about 0.05% sodium azide. This anti-Australia antigen solution is then coated on the tube surfaces and incubated at room temperature for from 6 to 72 hours and preferably for from 12 to 48 hours. These coated tubes are then washed with from about 0.005 to about 0.02 molar Tris-HCl at a pH of 6.9 to 8.4 plus from about 0.01% to about 0.05% sodium azide. Following this washing and rinsing step, the test implements may be stored at 4°C. until necessary for use for radioimmunoassay.

It is preferred to utilize a 0.01 molar solution of Tris-HCl and 0.02% sodium azide buffered at a pH of 7.1 for both the incubation medium and the washing medium.

The amount of antibody or antigen coated in the tubes is not critical since the test is run each time in comparison with at least one blank test. No standard curves or charts are necessary for the test of the present invention; therefore, no specific amount of antibody or antigen in the coating is required as long as two similar tubes are used.

Although the coating method has been described with reference to a coated tube, the coating method may be utilized to prepare coated inserts for use with wells, etc. by dipping the inserts in the antigen or antibody solution and following the remaining procedure.

Antigens and antibodies which may be determined by means of the method of the present invention include: various intact viruses, virus capsids, virus subunits, bacteria, membranes, cell walls, various hormones, gamma globulins, etc. The only requirement with regard to the above materials is that the materials have a minimum of two antigenically active sites. Furthermore, antigens and antibodies having multiple combining sites are detectable even in the presence of their respective antibodies and antigens, provided a minimum of two free combining sites remain available. Although the radioimmunoassay method of the present invention is useful for detecting the above class of materials, it is especially well adapted, and this is a preferred embodiment of the present invention, for the determination of the presence of hepatitis associated antigens and antibodies, such as Australia antigen and anti-Australia antigen.

While the radioimmunoassay method of the present invention has been briefly described above, the method will now be described with reference to the specific materials and steps necessary for conducting the direct radioimmunoassay technique for determining the presence of the hepatitis associated antigen Australia antigen.

First, a measure sample of plasma or blood to be tested for hepatitis associated antigen is placed in an anti-Australia antigen coated tube. The material is incubated for a period of from 0.5 to 42 hours at room temperature and preferably for from 12 to 24 hours. The coated material is washed with the buffer mixture, i.e. Tris-HCl and sodium azide. A measured amount of purified I-125 labeled anti-Australia antigen is then added to the tube or test receptacle well and the tube or insert in contact therewith is incubated for an additional 1 to 24 hours at room temperature and preferably for from 1.5 to 6 hours. Following this incubation, the contents are washed utilizing the buffer mixture and the tube is placed in the well of a counter which is capable of counting gamma radiation. Background controls in duplicate are run simultaneously utilizing a normal plasma in place of the tested plasma and tested in a similar manner. If the unknown plasma has a higher count rate than the background, it is considered hepatitis associated antigen positive.

Generally, it is preferred to utilize a counting time of one minute, however, if a sample is quite close to the upper limit of the control, a longer counting time up to 10 minutes may be utilized in order to obtain exact counting results.

As noted above, the incubations are generally conducted at room temperature although slight warming up to about 35°C. may be utilized to shorten the incubation time.

Generally, the buffer medium contains from about 0.005 to about 0.02 molar Tris-HCl and from about 0.01 to 0.05% by weight sodium azide at a pH of 6.9 to 8.4. The preferred buffer comprises 0.01 molar Tris-HCl and 0.02% by weight soidum azide.

Generally, the tests are run using undiluted blood serum or plasma, however, if samples are limited, a suitable dilution of the sample in normal serum or plasma, such as bovine serum albumen or in a buffer mixture, such as a mixture of Tris-HCl, and sodium azide, a mixture of Tris-HCl, sodium azide and 1% borine serum albumen, etc. may be used.

Also, although the method of the present invention has been described with reference to I-125 tagged antigens or antibodies, the preferred radioactive material, any radioisotope generally used for tagging or tracing antigens or antibodies in radioimmunoassay procedures may be utilized.

As noted above, the process of the present invention utilizes a direct radioimmunoassay technique for the determination of various antigens and their antibodies, especially hepatitis associated antigen or its antibody. Furthermore, if a quantitative determination of hepatitis associated antigen is desired, a standardized curve directly showing the relationship between counts per minute and the amount of hepatitis associated antigen may be utilized.

The foregoing methods and the apparatus of the present invention will now be illustrated by the following specific example which is for the purpose of illustration only and is not to be taken as limiting. In the following example all parts and percentages are by weight and all temperatures in degrees centigrade.

EXAMPLE

The tube as shown in the drawing which is molded from polystyrene is coated with a purified hepatitis associated antibody. This coating is applied by subjecting the surface of the tube to a diluted solution of hepatitis associated antibody in 0.01 molar Tris-HCl at a pH of 7.1 and 0.02% by weight sodium azide and the coated tube is incubated at room temperature for one day. The tube is then washed with aliquots of 0.01 molar Tris-HCl plus 0.02% by weight sodium azide. These tubes may be stored at 4°C. until use. Three 100u l. plasma samples are placed one each in three separate coated tubes, each tube being coated with hepatitis associated antibody. One of these plasma samples is the unknown, the other two are negative for hepatitis associated antigen. Eash step in the procedure is applied to each of the three samples. The two negative samples provide the background radiation against which the unknown sample is ultimately compared. These samples are then set aside and incubated for 18 hours at room temperature. At the end of this time, the coated tubes are washed with aliquots of the incubation buffer mixture. At this time, 2.5 ng of purified I-125 labeled hepatitis associated antibody in 0.1 ml. volume are placed into each coated tube. The tubes are again set aside and incubated for two hours after which time the tube is washed again with aliquots of the incubation buffer mixture. Eash of the negative plasma samples is counted utilizing a conventional radiation counter having a well and capable of detecting gamma radiation. The negative samples are counted for 1 minute and the average number of counts per minute is determined; in this case, 200 counts per minute. The unknown sample is then counted in the same manner and compared with the average value of counts per minute of the negative plasma samples plus a correction factor equal to 50% of the counts per minute of the negative sample. The unknown plasma in this case has a count rate of 400 counts per minute which is above the 300, i.e. 200 plus 50% of 200 = 300, which is the maximum for a negative test.

As is evident, the above-noted test procedure provides a simple yes-no test for determining the presence or absence of hepatitis associated antigen in an unknown sample of blood or plasma. Although some correction factor is required, the test is quite conclusive and reproducible and has a high degree of accuracy.

While the process of the present invention has been illustrated by way of the foregoing specific example, the process of the present invention should be in no way limited thereto but should be construed as broadly as any and all equivalents in the appended claims.

What is claimed is:

1. A method for determining the presence of a hepatitis associated antigen or its antibody capable of being bound to two hepatitis associated antigens or antibodies respectively in an unknown sample utilizing direct radioimmunoassay comprising:
   a. forming a solution of said hepatitis associated antigen or antibody in a buffer mixture;
   b. coating a test apparatus by contacting said test apparatus with said solution and
   c. incubating said test apparatus while in contact with said solution;
   d. washing said incubated coated test apparatus with a buffer mixture;

e. placing said unknown sample in contact with said incubated and washed test apparatus;

f. incubating said unknown sample while in contact with said coated test apparatus for from 0.5 to 42 hours to bond any of said hepatitis associated antigen or antibody present in said unknown sample to said incubated test apparatus;

g. washing said incubated test apparatus with a buffered solution to remove said unknown sample leaving said bonded hepatitis associated antigen or antibody on the coating of said test apparatus;

h. contacting said washed test apparatus with a purified form of said hepatitis associated antigen or antibody labeled with the radioactive isotope I-125;

i. incubating said washed test apparatus while in contact with said purified form of said hepatitis associated antigen or antibody labeled with a radioactive isotope so as to bond said purified form to said antigen or antibody bonded on said test apparatus and thereby produce a radioactively traced incubated coating;

j. washing said radioactively traced incubated coating with a buffered solution to remove any unbonded purified form;

k. counting radiation emitted from said radioactively traced incubated coating; and l. comparing the number of counts from said coating with the number of counts from a control sample prepared by steps (a) to (k).

2. The method of claim 1 wherein said test apparatus and said formed solution of said antigen or antibody are incubated for a period of from 6 to 72 hours.

3. The method of claim 1 wherein the buffer mixture of said three washing steps comprises 0.02 % by weight sodium azide in a 0.01 molar solution of 2-amino-hydroxymethyl-1, 3-propanediol hydrochloride.

4. The method of claim 1 wherein said test apparatus and said purified form are incubated for from 1 to 24 hours at room temperature.

* * * * *